REISSUED

Patented Dec. 22, 1936

MAR 25 1947

2,065,398

UNITED STATES PATENT OFFICE 2,065,398

METHOD OF MANUFACTURING ICE CREAM AND THE PRODUCT THEREOF

Warren D. Roth, Leo C. Brown, and Guy W. Phelps, Chicago, Ill., assignors to Industrial Patents Corporation, Chicago, Ill., a corporation of Delaware No Drawing. Application November 26, 1934, Serial No. 754,842. In Canada July 21, 1933

16 Claims. (Cl. 99—136)

This invention relates to improvements in ice cream, frozen confections and the like and in methods of preparing such food products.

One of the objects of the present invention is to provide a method for preparing ice cream and the like whereby the percentage of overrun may be controlled. Another object of the invention is to produce an ice cream product with improved texture. Another object of the invention is to provide a method whereby overrun in the manufacture of ice cream products may be obtained in a shorter time than has been hitherto possible. Other objects of the invention will be apparent from the description and claims which follow.

This application is a continuation in part of our application entitled Method of manufacturing ice cream and the product thereof, Serial No. 673,476, filed May 29, 1933.

In the usual process of manufacturing ice cream, the mix is made up of liquid and dry ingredients. The liquid ingredients such as cream, milk, unsweetened condensed skim milk, sweetened condensed skim milk or condensed whole milk are mixed in the proper proportions so that the finished product will, after the dry ingredients have been added and are in solution, give the required amount of fat, sugar, serum solids, and stabilizer. The dry ingredients, such as sugar, skim milk powder, whole milk powder, gelatin or gums, are triturated together and then added to the liquid ingredients, care being taken to avoid lumping.

After incorporation of the dry ingredients with the liquid ingredients the mix is pasteurized, homogenized, aged and frozen. To secure a velvety texture in the finished product, it is desirable in the manufacture of ice cream to incorporate such agents as gelatin, egg yolk or lecithin to cause the formation of finer ice crystals than would be formed in the absence of such agents.

Although, such agents are more or less useful in developing the desirable finer ice crystals, it has been found difficult to control the amount of overrun and at times difficult to obtain as much overrun as is necessary to secure the best texture in the finished product.

The present invention contemplates the incorporation of a small amount of a substance in the mix under the proper conditions whereby the texture of the finished product is improved and a controlled overrun obtained in a shorter time than has heretofore been possible. The substance used is an ester of fatty acid and polyhydric alcohol having one or more free alcoholic hydroxyl groups on the polyhydric alcohol component of the ester. Specifically, the substance may be a mono acid glyceride, di acid glyceride, mono acid ester of ethylene glycol, mono acid ester of di ethylene glycol or any ester of polyhydric alcohol and fatty acids characterized by having one or more free alcoholic hydroxyl groups.

By way of illustration but not by way of limitation the invention will be hereinafter described in examples with mono or di acid glyceride, that is, glyceryl ester of a fatty acid having a free glyceryl group as the addition substance which brings about the desired overrun and improvement in the product.

In manufacturing ice cream in accordance with the present invention, using mono or di acid glyceride as the addition substance, the liquid ingredients are first mixed in the usual way and then mono or di acid glyceride is added either directly to the liquid ingredients or in a shredded or finely divided state with the dry ingredients. A small amount of the mono or di acid glyceride is sufficient to give the desired results.

Ice cream mix may be prepared in accordance with the present invention with a variety of different formulae. Examples are as follows:

|  | Formula #1 | Formula #2 |
|---|---|---|
|  | Pounds | Pounds |
| 40% cream | 265.26 | 265.37 |
| 3½% milk | 539.9 | 538.63 |
| Skimmilk powder | 50.84 | 51.00 |
| Sugar | 140.00 | 140.00 |
| Gelatin | 3.00 | 3.00 |
| Mono or di acid glyceride | 1.00 | 2.00 |
| Total | 1,000 | 1,000 |

In the manufacture of ice cream, overrun is controlled by the use of an overrun scale. During the freezing process, small portions of ice cream are drawn out into a cup or container and weighed on the overrun scale. When the desired overrun is obtained, the ice cream is drawn from the freezer to be packed.

Gelatin is added to ice cream to give it a firm body of uniform texture, to prevent the formation of coarse ice crystals and to increase the quality of ice cream as a food. Because of its colloidal nature, gelatin acts as a stabilizer, the gelatin forming a tiny capsule about each small particle of frozen mix, preventing small particles from coming together and forming larger particles and a consequent grainy product. It has been known for sometime that egg yolk gives a smoothness to ice cream that cannot be obtained by the use of gums or gelatin. When egg yolks are added to ice cream, the overrun is obtained in less time than it could be obtained with gelatin or gum alone. Egg yolks are not added as a substitute for a stabilizer but in order to obtain overrun more quickly and thus reduce power consumption and produce higher overruns.

Egg yolks are commonly used at certain seasons of the year when the ingredients of the mix may not have the proper salt balance and, consequently, render it difficult when using such ingredients to obtain the necessary overrun.

We have found that the use of mono or di acid glyceride renders the use of egg yolk unnecessary. We have made tests using gelatin as a stabilizer in control mixes which have given maximum overruns of about 90%. With the addition of a very small amount of mono or di acid glyceride we have obtained overruns as high as 117% without the use of egg yolks.

In practice we have successfully secured an overrun of 100% in six minutes by the addition of mono glyceride. A control sample to which no mono acid glyceride was added showed an overrun of 91% at the end of six minutes and an overrun of 100% was not secured until twelve minutes had elapsed.

The material discussed in the foregoing examples as added to obtain the overrun, namely, glyceryl ester of fatty acid having a free glyceryl alcohol group, is a fragment of a fat molecule possessing one or more free alcohol groups and one or more ester groups. Specifically, the material may be the mono glyceryl ester of a higher fatty acid or the di glyceryl ester of a higher fatty acid or a mixture of both. Both the mono and the di glyceride of a higher fatty acid are esters of the alcohol "glycerol" and a higher fatty acid and each have a free alcohol group in each molecule.

This invention is not concerned with the preparation of the mono or di glyceride of a higher fatty acid or of the other substances herein described as valuable in obtaining the desired improvements in ice cream and it is not believed necessary to describe a particular method of preparation.

The mono or di glyceryl ester of various fatty acids may be employed but by way of illustration the mono or di glyceryl ester of stearic acid may be mentioned as preferable.

The term "higher fatty acid" as used in the claims is used in a restricted sense to include those fatty acids found in such normal fats as butter, cocoanut oil, cottonseed oil, peanut oil, hog lard, beef fat, mutton fat, and other edible fats and oils.

We claim:

1. As an article of manufacture, a new food product composed of ice cream containing a small percentage of glyceryl ester of a higher fatty acid having a free glyceryl alcohol group.

2. As an article of manufacture, a new food product composed of ice cream containing up to 0.2 per cent by weight of glyceryl ester of a higher fatty acid having a free glyceryl alcohol group.

3. The process of controlling overrun in the manufacture of ice cream which comprises preparing the desired mix and adding thereto a small percentage of glyceryl ester of a higher fatty acid having a free glyceryl alcohol group.

4. The process of manufacturing an improved ice cream product which comprises adding and dissolving therein a small percentage of di glyceryl ester of a higher fatty acid during one of the stages of mixing.

5. As an article of manufacture, a new food product consisting of ice cream containing a small percentage of di glyceryl ester of a higher fatty acid.

6. As an article of manufacture, a new food product consisting of ice cream containing a small percentage of a mixture of mono glyceryl ester of a higher fatty acid and di glyceryl ester of a higher fatty acid.

7. The process of manufacturing an improved ice cream which comprises adding to the ice cream mix a small percentage of a mixture of mono glyceryl ester of a higher fatty acid and di glyceryl ester of a higher fatty acid during the mixing.

8. As an article of manufacture, a new food product composed of ice cream containing a small percentage of mono glyceryl ester of a higher fatty acid.

9. The process of manufacturing ice cream which comprises adding thereto a small percentage of mono glyceryl ester of a higher fatty acid.

10. As an article of manufacture a new food product consisting of ice cream to which has been added a small percentage of mono glyceryl ester of stearic acid.

11. As an article of manufacture a new food product composed of ice cream containing a small percentage of mono acid ester of ethylene glycol.

12. As an article of manufacture a new food product composed of ice cream containing a small percentage of mono acid ester of di ethylene glycol.

13. The process of manufacturing an improved ice cream product which comprises adding thereto and dissolving therein a small percentage of mono acid ester of ethylene glycol.

14. The process of manufacturing an improved ice cream product which comprises adding thereto and dissolving therein a small percentage of mono acid ester of di ethylene glycol.

15. The process of manufacturing an improved ice cream product which comprises adding thereto and dissolving therein a small percentage of an ester of a polyhydric alcohol and a higher fattty acid being characterized by one or more free alcoholic hydroxyl groups in the polyhydric alcohol part of the ester.

16. As an article of manufacture a new food product composed of ice cream containing a small percentage of an ester of a polyhydric alcohol and a higher fatty acid being characterized by one or more free alcoholic hydroxyl groups in the polyhydric alcohol part of the ester.

WARREN D. ROTH.
LEO C. BROWN.
GUY W. PHELPS.